US009826498B2

(12) United States Patent
Tuominen et al.

(10) Patent No.: US 9,826,498 B2
(45) Date of Patent: Nov. 21, 2017

(54) METHOD AND APPARATUS FOR MAINTAINING ACCESS POINT INFORMATION

(75) Inventors: Petri Tuominen, Nivala (FI); Janne Marin, Espoo (FI); Jukka Reunamaki, Tampere (FI); Mauri Honkanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 163 days.

(21) Appl. No.: 13/822,674

(22) PCT Filed: Sep. 13, 2010

(86) PCT No.: PCT/FI2010/050698
§ 371 (c)(1),
(2), (4) Date: Mar. 13, 2013

(87) PCT Pub. No.: WO2012/035190
PCT Pub. Date: Mar. 22, 2012

(65) Prior Publication Data
US 2013/0182697 A1   Jul. 18, 2013

(51) Int. Cl.
*H04W 64/00* (2009.01)
*G01S 5/02* (2010.01)
*H04W 8/00* (2009.01)
*H04W 36/08* (2009.01)
*H04W 88/08* (2009.01)

(52) U.S. Cl.
CPC ......... *H04W 64/003* (2013.01); *G01S 5/0242* (2013.01); *H04W 8/005* (2013.01); *H04W 36/08* (2013.01); *H04W 64/00* (2013.01); *H04W 88/08* (2013.01)

(58) Field of Classification Search
None
See application file for complete search history.

(56) References Cited

U.S. PATENT DOCUMENTS

| 7,257,413 | B2* | 8/2007 | Sheynblat | 455/456.1 |
| 7,319,878 | B2 | 1/2008 | Sheynblat et al. | |
| 7,414,988 | B2 | 8/2008 | Jones et al. | |
| 7,561,890 | B2* | 7/2009 | Jendbro et al. | 455/456.6 |
| 7,577,443 | B1 | 8/2009 | Moll et al. | |

(Continued)

FOREIGN PATENT DOCUMENTS

EP   2056532 A1   5/2009

OTHER PUBLICATIONS

International Search Report of PCT/FI2010/050698 dated May 20, 2011.

(Continued)

*Primary Examiner* — Alex Skripnikov
(74) *Attorney, Agent, or Firm* — Banner & Witcoff, Ltd.

(57) ABSTRACT

In a non-limiting and exemplary embodiment, a method is provided for arranging wireless communications, comprising: establishing, by an apparatus, a connection with an access point, detecting location of the access point, detecting accuracy of the detected location of the access point, and in response to detecting the detected location of the access point to be more accurate than an earlier stored location of the access point, updating the detected location to a location database of the apparatus.

23 Claims, 5 Drawing Sheets

(56) References Cited

U.S. PATENT DOCUMENTS

| | | | |
|---|---|---|---|
| 8,184,170 B2* | 5/2012 | Yamaji | G01S 19/48 348/211.2 |
| 2006/0240840 A1* | 10/2006 | Morgan et al. | 455/456.1 |
| 2007/0121560 A1 | 5/2007 | Edge | |
| 2007/0149211 A1 | 6/2007 | Dunn et al. | |
| 2008/0101277 A1* | 5/2008 | Taylor | G01S 5/0289 370/328 |
| 2008/0225779 A1 | 9/2008 | Bragiel et al. | |
| 2008/0299992 A1 | 12/2008 | Eitan et al. | |
| 2009/0061870 A1* | 3/2009 | Finkelstein et al. | 455/435.2 |
| 2009/0061892 A1 | 3/2009 | Lee et al. | |
| 2010/0329123 A1 | 12/2010 | Viswanathan et al. | |
| 2012/0122422 A1* | 5/2012 | Olsson | H04L 12/4633 455/410 |

OTHER PUBLICATIONS

Office Action of related Russian Application No. 2013114718, dated Oct. 23, 2014.
Sep. 30, 2016 (EP) Extended Search Report—App. 10857202.5.

\* cited by examiner

METHOD AND APPARATUS FOR MAINTAINING ACCESS POINT INFORMATION

FIELD

The exemplary and non-limiting embodiments of this invention relate to maintaining access point location information.

BACKGROUND

Wireless local area networks (WLANs) are very widely used for wireless local connectivity and Internet access. As data transferred to and from mobile devices is increasing, there is a need to enable use of additional or alternative connections in mobile terminals in addition to cellular connections. WLAN access is one example of such further bearer. A mobile terminal may be arranged to periodically scan for available WLAN access points. There is a need for efficient means to guide a mobile device when to switch from primary connection, such as a cellular connection, to an alternative bearer, such as a WLAN bearer. Access point location information may be applied for this purpose. However, there is a need to further enhance management of access point information.

SUMMARY

Various aspects of examples of the invention are set out in the claims.

According to a first embodiment, there is provided a method, comprising: detecting location of an access point connected or connectable by an apparatus, detecting accuracy of the detected location of the access point, and in response to detecting the detected location of the access point to be more accurate than an earlier stored location of the access point, updating the detected location to a location database of the apparatus.

According to a second embodiment, there is provided an apparatus comprising at least one processor and at least one memory including computer program code, the at least one memory and the computer program code configured to, with the at least one processor, cause the apparatus at least to perform: detect location of an access point connected or connectable by the apparatus, detect accuracy of the detected location of the access point, and in response to detecting the detected location of the access point to be more accurate than an earlier stored location of the access point, update the detected location to a location database of the apparatus.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
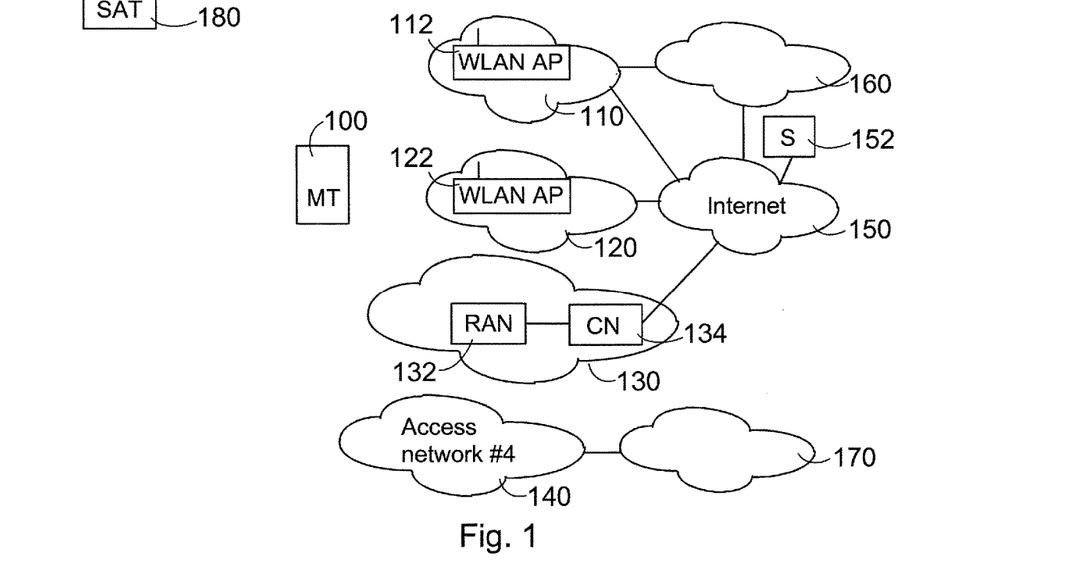
FIG. 1 illustrates a wireless networking system.

An embodiment of the invention will be illustrated in the following with reference to the communications system in FIG. 1. As illustrated in the simplified FIG. 1, a plurality of networks 110, 120, 130, 140 may be available in a given geographical area for a multimode capable wireless communications device 100, hereafter referred to as a mobile terminal (MT) 100.

The networks 110-140 serve as access networks to connected further services and/or networks 150, 160, 170, such as the Internet and further devices 152. Networks 110, 120 may be wireless local area networks WLAN, such as IEEE 802.11 based networks comprising wireless access points 112, 122 connected to a further network(s). In typical WLAN deployments, the MT 100 functions as a station (STA), which needs to associate with an access point (AP) in order to gain access to a network.

A cellular network 130 comprising a radio access network (RAN) 132 and a core network (CN) 134 is typically available for the MT 100. The cellular network may be a network standardized by the Third Generation Partnership Project (3GPP) or the Third Generation Partnership Project Two (3GPP2), for instance. A 3GPP network may comprise a Wideband Code Division Multiple Access (WCDMA) access network and a core network supporting General Packet Radio Service (GPRS) and/or an Evolved UMTS Radio Access Network (E-UTRAN) and Long Term Evolution (LTE) core network, for providing a cellular mobile data access service.

However, it will be appreciated that these are only some examples of access network types and access points which may be available for a mobile terminal, and one or more further networks 140 and access points may be available. The application of the present access point location related features is not limited to any particular network configuration or network protocol, and the MT 100 may be configured to support wireless communications according to any suitable standard/non-standard wireless communication systems.

Instead of a network architecture comprising a plurality of network elements, a communications device, available as an access point for the MT 100, may be even a single radio device connected to a further communications device. Also a mobile communications device, such as a mobile node or a wireless access point, capable of providing ad-hoc connections, may be visible for the MT 100 as an available access network. For instance, a self-configuring mobile ad-hoc network may be available for the MT 100 as an access network.

The MT 100 may comprise a satellite positioning receiver to receive satellite positioning information from a satellite system 180, such as global positioning system (GPS) satellites. Instead of or in addition to satellite based positioning, the MT 100 may be arranged to obtain location information from other sources or using other methods, such as a location information server in a cellular network or estimating location on the basis of known location of nearby radio transmitters, for instance WLAN APs 112, 3GPP RAN Node Bs. The MT 100 may be arranged to calculate location estimate on the basis of information stored in the MT 100 and which can be used to estimate location, such as WLAN AP 112, 122 locations. Some examples of mobile positioning techniques, which may be applied for determining the location of the MT 100, include enhanced cell identification, GPS, assisted GPS, time of arrival (TOA) uplink-time difference of arrival (U-TDOA), angle of arrival (AOA), enhanced observed time difference (E-OTD), etc.

Figure 2:
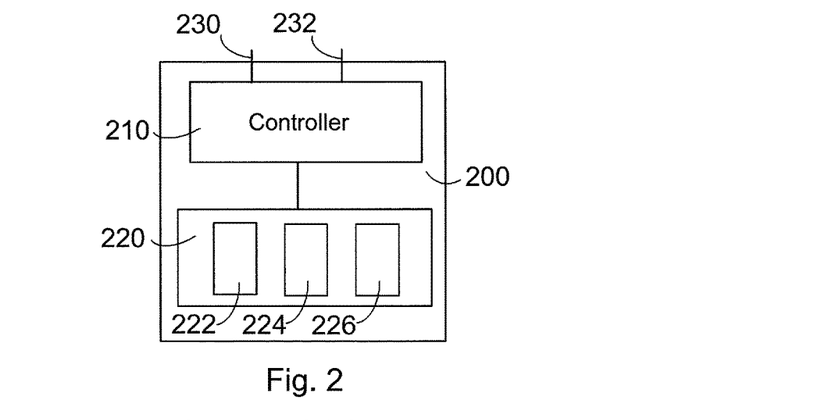
FIG. 2 illustrates an apparatus according to an embodiment.

FIG. 2 illustrates a simplified block diagram of an apparatus 200 according to an embodiment. The apparatus 200 comprises a controller 210 to control at least updating of access point information in a database, referring to any type of data storage 220 in the apparatus 200. Access point location data and other access point data may be stored 222, 224, 226 in the data storage 220 for each visited access point 122. The data may be stored as settings or parameters for network discovery, selection and/or connection establishment.

Figure 3:
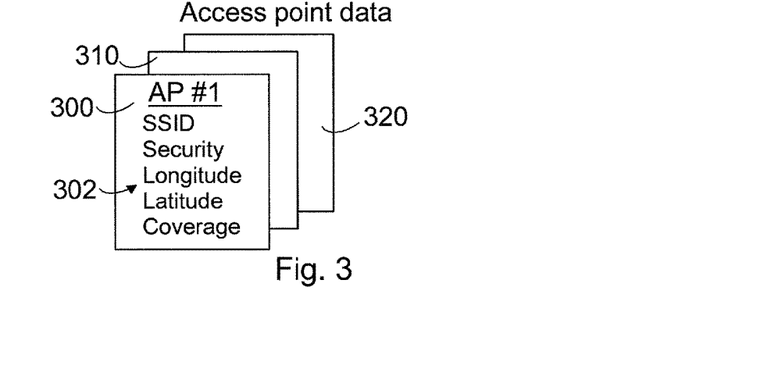
FIG. 3 illustrates access point information record content according an embodiment.

FIG. 3 illustrates an example of access point information records 300, 310, 320 for WLAN access points. In one embodiment an access point record 300 comprises access point location related information 302. The location may be stored as anchor longitude and latitude values, for instance. Further location-related values may also stored, such as coverage area information, e.g. coverage radius, and received signal strength indicator (RSSI) level and/or accuracy associated with the access point location. The access point information 300 may also comprise further information, such as identification information (e.g. a service set identifier SSID), security information and further connection establishment related settings. However, it is to be appreciated that further information may also be stored, and one or more further records may be used to store some access point information, such as connection establishment related settings. The access point location and accuracy information may be applied as parameters for access point information update function, as will be further illustrated below.

The controller 210 is connected by at least one interface to one or more further units or modules. In one embodiment, the controller 210 is arranged to receive information regarding access point signal strength measurements 230 and location information 232 of an access point 112, 122 or for determining the location of an access point. For example, the controller 210 may be arranged to detect location of the apparatus on the basis of location information from a GPS receiver via the interface 232.

The apparatus 200 and the controller 210 may be arranged to implement at least some access point information control related functions illustrated in further detail later with reference to the mobile terminal 100. In some embodiments, the controller 210 is arranged to update detected location to the location database 220 of the apparatus 200 on the basis of signal strength information associated with a recently detected access point location and accuracies associated with the detected access point location and an earlier stored location. If the signal strength exceeds a threshold and the detected location of the access point is more accurate than an earlier stored location of the access point, the detected location is updated to a location database of the apparatus.

Although the apparatus 200 and the controller 210 are depicted as a single entity, different modules and memory may be implemented in one or more physical or logical entities. For instance, the controller 210 could comprise a specific functional module for carrying one or more of the steps in FIG. 4, 5, 6, or 7. It should be appreciated that the apparatus 200 may comprise other units, not discussed in more detail here. The apparatus 200 could be in a form of a chip unit or some other kind of hardware module for controlling a mobile communications device.

The apparatus 200 may be implemented as an electronic digital computer, which may comprise memory, a processing unit or chipset with one or more processors, and a system clock. The processing unit may be adapted to implement the controller 210. The processing unit may be controlled by a sequence of program instructions transferred to the processing unit from the memory.

An embodiment provides a computer program embodied on a computer-readable storage medium. Such computer program may comprise one or more sequences of one or more instructions which, when executed by one or more processors of the apparatus, cause the apparatus to perform at least some of the access point location information control related functions illustrated below in connection with FIGS. 4 to 7. In an embodiment such computer program code is stored in at least one memory of the apparatus 200, for instance the storage 220. The memory and the computer program code may be configured, with at least one processor of the apparatus 200, to provide means for and cause the apparatus 200 to perform at least some of the features illustrated below in connection with FIGS. 4 to 7. The access point location update related features may be implemented as part of connection communications management software, for instance.

Let us now further study some embodiments related to access point location control related features for the apparatus 200, with reference also to the mobile terminal 100.

Figure 4:
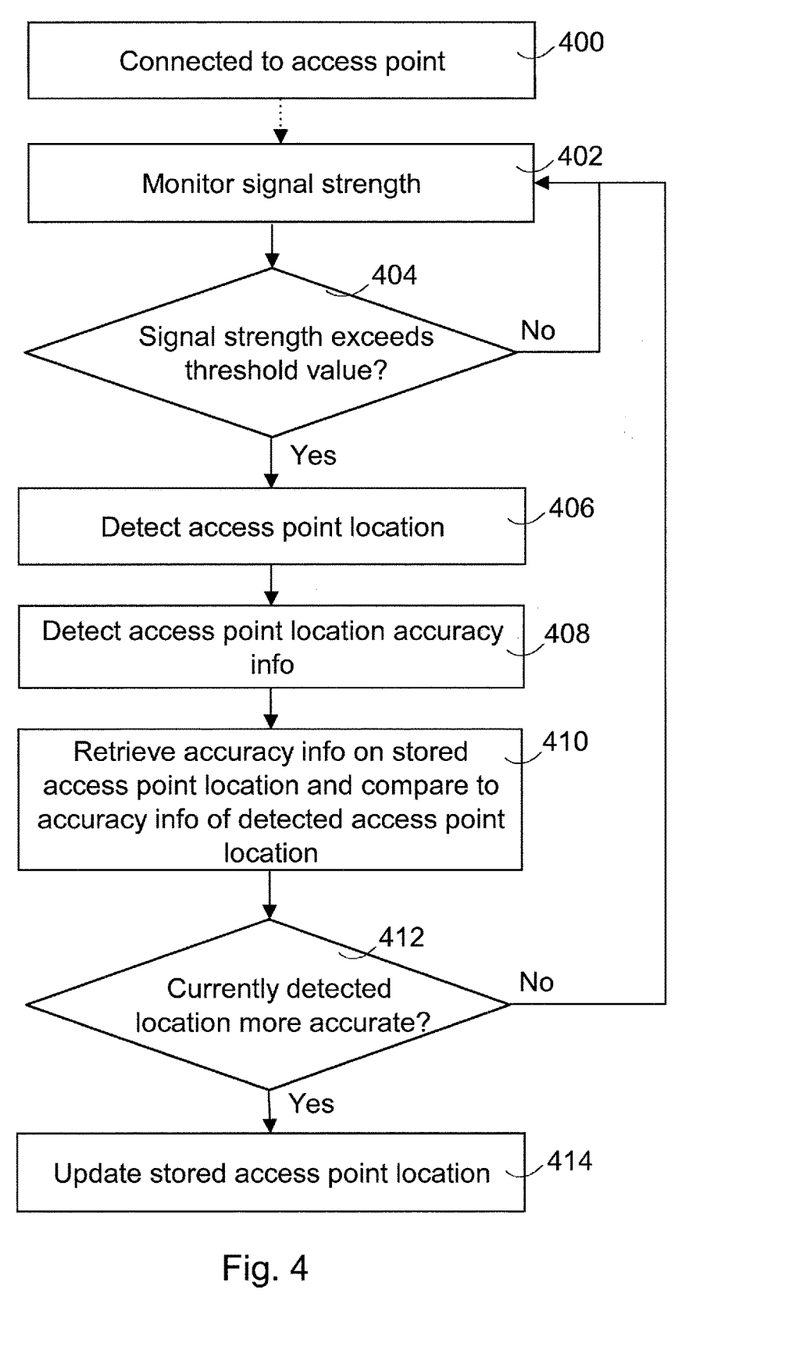
FIGS. 4 to 7 illustrate methods according to some embodiments.

FIG. 4 illustrates a method according to an embodiment. The method may be applied as a control algorithm by the controller 210 to automatically maintain access point location information and improve accuracy of the stored access point location, for instance.

After an apparatus 100, 200 carrying out the method has established 400 a connection to an access point, signal strength of the access point is monitored 402. The signal strength may be compared 404 to the threshold periodically or upon another trigger, for instance.

If the signal strength does not exceed the threshold, the procedure may return to block 402 and again monitor the signal strength later. If the signal strength instead exceeds a threshold, location of the access point may be detected 406. The detection of access point location refers generally to obtaining information of recently determined access point location estimate. The access point location may be determined by the apparatus carrying out the method of FIG. 4, or another entity.

The location of the access point may be determined on the basis of the current location of the mobile terminal 100. The current location of the mobile terminal 100 may be obtained in various ways. For instance, the location may be obtained based on location information from an internal GPS receiver and/or information received from memory of the MT 100 or further network elements, such as the server 152, which may be a secure user plane for location (SUPL) server. However, it will be appreciated that various other mobile location definition methods and combinations thereof may be applied. The MT 100 may also be arranged to estimate (in)accuracy of mobile terminal location estimate. For instance, the inaccuracy of the mobile terminal location estimate may be determined based on GPS signal strength.

Accuracy information of the newly detected location of the access point is detected 408. Accuracy of an access point location is to be broadly understood to refer to any type of information enabling to assess reliability of different location definitions for a given access point. The detection of the accuracy is also to be broadly understood to cover various ways of obtaining accuracy information. For instance, the accuracy may be estimated by the apparatus carrying out the method of FIG. 4, or the accuracy information may be provided by another entity with the location information.

Accuracy information associated with an earlier stored access point location 302 is retrieved and compared 410, 412 to the accuracy of the detected access point location. As illustrated in FIG. 2, accuracy information associated with the earlier stored access point location 302 may be stored within the access point location information 300.

If the detected location of the access point location is more accurate than the earlier stored location of the access point, the detected location may be updated 414 to the location database 220 of the apparatus to replace the access point location value stored earlier. Alternatively, the process may return to block 402 to monitor the signal strength after a time period, for instance. It is to be noted that in some cases block 402 may be entered also after block 414, if it is desirable to implement periodical access point location evaluation routine.

In one embodiment, the accuracy of the access point location is determined on the basis of signal strength of the access point at the time of definition of the location. In some embodiments, the access point location accuracy is detected at least partly on the basis of a location inaccuracy estimate based on the signal strength of the access point. The location estimation accuracy can be based on information stored in the MT 100 and/or received from an external resource, which may be the same as the source of the access point location information.

However, also other properties associated with the location definition may be used to define the accuracy, instead or in addition to the signal strength. In one embodiment, (in)accuracy information associated with the location accuracy estimate may be applied. Thus, an inaccuracy value associated with the mobile terminal location detected in block 406 may affect the total access point location inaccuracy. For instance, the access point location accuracy may be determined (directly or indirectly) on the basis of one or more of quality of GPS signal, direction of GPS signal, (in)accuracy value associated with of the GPS signal, estimated distance of the access point, estimated direction of the access point, inaccuracy associated with the direction and/or direction, time of arrival (TOA) information, etc.

Figure 5:
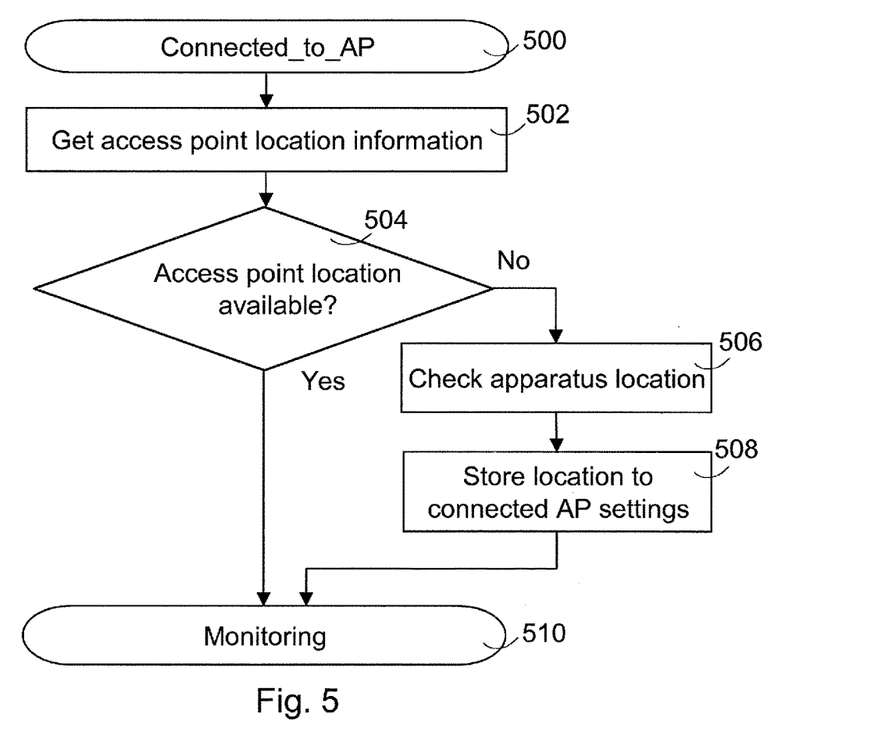

FIG. 5 illustrates another method according to an embodiment. The features of FIG. 5 may be applied as an initial access point location addition algorithm by the controller 210 after a new access point has been successfully connected 500, for instance. Access point location information is searched for 502, 504. In response to location information not being available for the access point in question, location of the access point is obtained 506, either by defining the access point location (estimate) by the apparatus 100, 200 carrying out the method of FIG. 5, or by requesting the location information from an external entity. For instance, within block 506 there may be a further logic first checking if the GPS receiver of the MT 100 is on. If yes, the location information is obtained based on the GPS signal. Otherwise, location is requested from a server.

The obtained location of the access point is then stored 508, for instance as a new entry 222 in the location database 220 of the apparatus 200. As also indicated in FIG. 5, the method may continue to monitoring 510 at least the currently connected access point. For instance, the MT 100 may enter block 400 in block 510.

The example method of FIG. 5 thus illustrates a procedure for ensuring initial storage of access point location (for an access point connected for the first time) in the MT 100. It will be appreciated that location of the access point may be determined in various situations without the check 504 of FIG. 5, for instance in block 406 by using the procedure of FIG. 4 periodically and/or always after connecting an access point.

The MT 100 may apply the access point information stored in the local database 220 in various ways. For instance, a connection management function or controller of the MT 100 may utilize the stored access point location information when searching for candidate access points for alternative bearer establishment, in response to a need to attempt connection establishment to an access point, or when connected to an access point. In one example embodiment, the MT 100 may, while having a cellular connection, attempt to establish a connection to a WLAN access point 112, 122 at least partly on the basis of the stored location of the access point and the detected location of the MT 100. Thus, since more accurate location information is available, it becomes possible to further facilitate control of a mobile device from primary connection to alternative connections, for instance.

Figure 6:
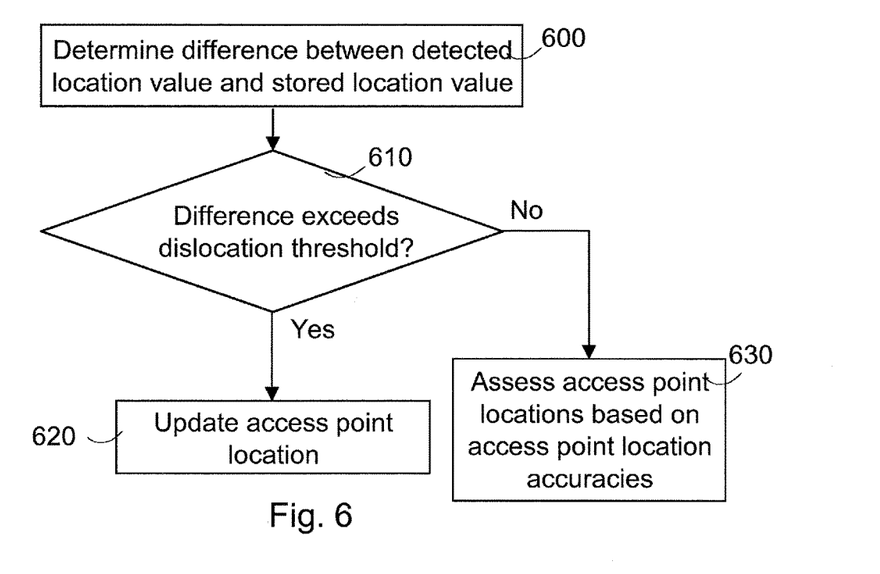
Figure 7:
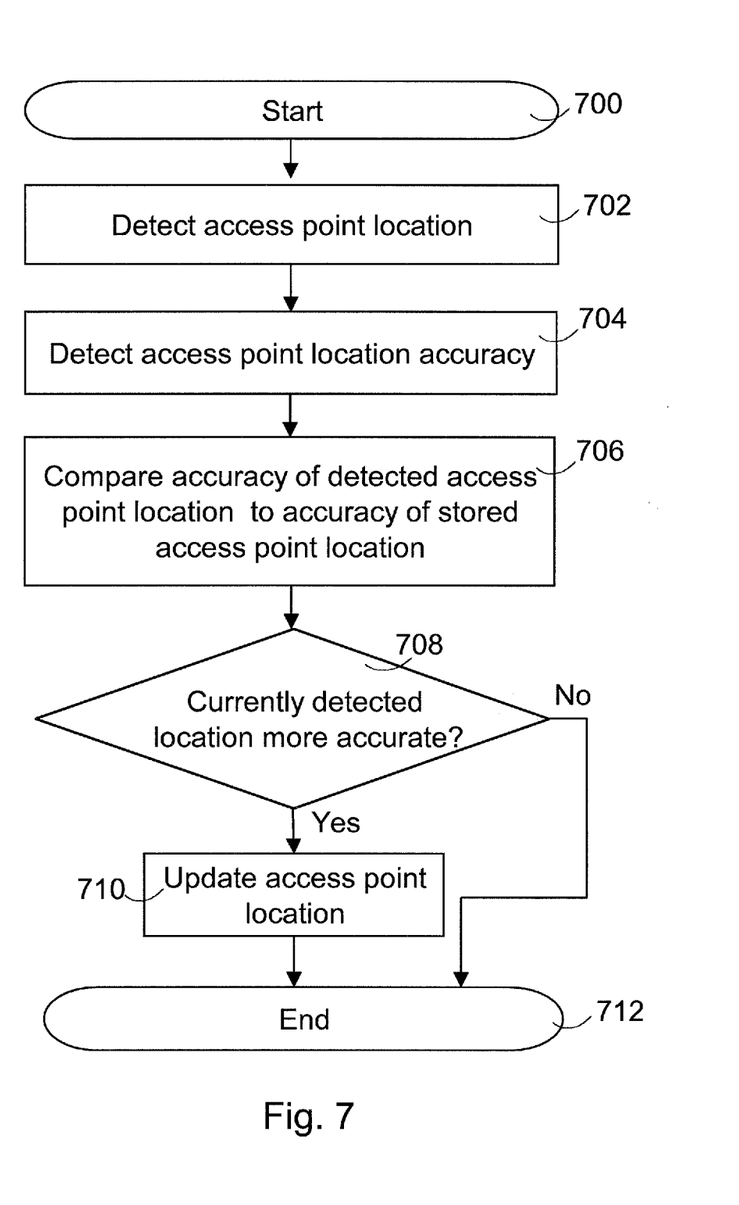

FIG. 6 illustrates further features of a method according to another embodiment. In one embodiment the detected location of the access point is compared 600, 610 to the earlier stored location. If the difference between the detected location and the stored location exceeds a dislocation threshold, the stored location is replaced 620 with the detected location without comparing or regardless of the location accuracies. Such dislocation threshold could be from the range between 100 to 500 meters, for instance. If the difference between the detected location and the stored location does not exceed the dislocation threshold, the access point locations may be compared 630 on the basis of the accuracies associated with the respective access point locations. For instance, step 402 or 408 of FIG. 4 may be entered. This method enables to better detect situations where the access point has been moved to another location.

It is to be appreciated that the above methods illustrate only some examples of procedures for managing access point location information, and that various modifications may be made to the procedure illustrated in FIGS. 4 to 6. For instance, at least some of the blocks 402 to 414 of FIG. 4 may be applied even if a communications connection is not established (400) to the access point in question.

Another example is that the apparatus 100, 200 may be arranged to manage 410 to 414 the access point location information update without preceding signal strength checking 402, 404. Such method for managing access point location information on the basis of access point location accuracy information is also illustrated also in FIG. 7. In block 702 access point location is detected, by applying an access point location definition technique illustrated above in connection with block 406, for instance. After detecting 704 accuracy of the detected access point location, the accuracy of the detected access point location is compared 706, 708 to accuracy of stored access point location. The access point location in the database (220) of the apparatus 200 is updated with the access point location detected in block 704. Blocks 702 to 710 may be applied as a control routine in the MT 100. The method of FIG. 7 may be applied in connection with one or more of the further embodiments, some of which are disclosed herewith.

A further example variation is that the order of at least some of the blocks may be changed, such as that of blocks 402+404, 406, 408, 706, 708. A still further example is that there may be two or more threshold values or further criterion applied in before entering access point location accuracy comparison, or a threshold value may applied in connection with block 412, 708.

According to some embodiments, after confirming (414) that the newly detected access point location is more accurate that the earlier stored location, the MT 100 may be arranged to report the newly detected access point location to one or more further devices. Thus, also other devices may benefit from the more reliable access point location.

In an embodiment, access point location information is stored in a device management object. In a further embodiment, the access point location information is initially stored and updated in an access network discovery and selection function (ANDSF) management object. The structure and available nodes for an ANDSF object are specified in 3GPP specification TS 24.312, "Access Network Discovery and Selection Function (ANDSF) management object (MO)", reference is made e.g. to FIG. 4.1 of the version 9.1.0 available at the 3GPP web site. For example, the MT 100 may be arranged to maintain at least some WLAN access point information 300 in a WLAN_Location node object.

The MT 100 may thus comprise a device management client configured to communicate with an ANDSF device management server by a device management protocol, such as the OMA DM protocol. For example, the server 152 may be an ANDSF server. The ANDSF server may provision at least some ANDSF node information to the MT 100.

The MT 100 may be arranged to report access point location information, such as the updated location of an access point, to the ANDSF server after a connection has been established between the MT 100 and the server. The ANDSF server may update an ANDSF server database, and the server may be arranged to provision the updated location information to other ANDSF MOs of ANDSF DM clients, if appropriate. For example, the server may be arranged to update the received updated access point location to MOs of devices already including a record for the AP. It thus becomes possible to efficiently distribute corrected access point locations and improve the overall accuracy of access point location information in mobile devices. Also further access point information may be reported to the server, such as some or all information illustrated in connection with FIG. 3. For example, location accuracy, RSSI level measured associated with the updated location are reported together with the location information.

It will be appreciated that ANDSF and OMA DM are merely provided as examples of applicable methods, and other device management methods, for example, may be applied for updating access point location information in other devices. For example, mobile terminals 100 may directly exchange location information of (locally connectable) access points, or access points or other locally connectable devices may receive and further distribute access point location information.

Figure 8:
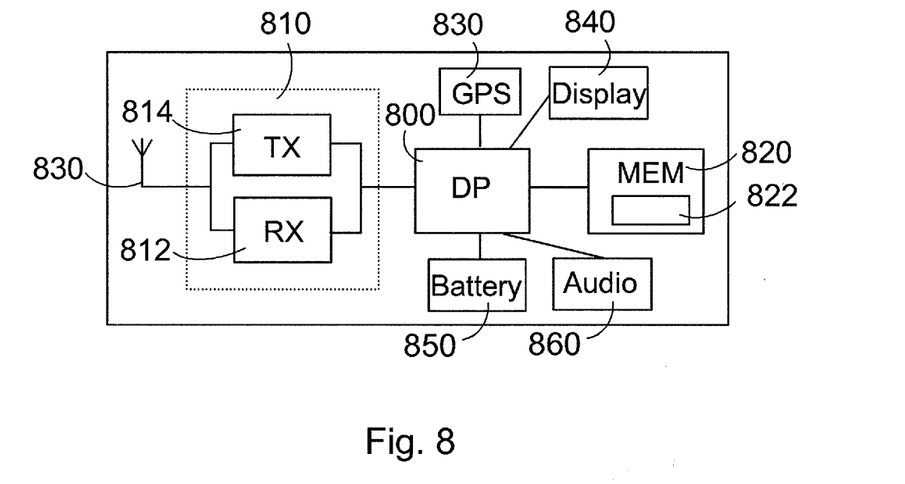
FIG. 8 illustrates a mobile terminal apparatus according to an embodiment.

FIG. 8 is a simplified block diagram of high-level elements of a mobile communications device according to an embodiment. The mobile communications device may comprise the apparatus 200 or represent another embodiment of the apparatus 200 of FIG. 2. The device may be configured to function as the MT 100, and carry out at least some of the functions illustrated above for the MT 100/apparatus 200.

In general, the various embodiments of the device can include, but are not limited to, cellular telephones, personal digital assistants (PDAs), portable computers, digital book readers, imaging devices, gaming devices, music storage and playback appliances, Internet access appliances, as well as other portable units or terminals that incorporate mobile communications functions.

The device comprises a data processing element DP 800 with at least one data processor and a memory 820 storing a program 822. The memory 820 may be implemented using any data storage technology appropriate for the technical implementation context of the respective entity. By way of example, the memory 820 may include non-volatile portion, such as EEPROM, flash memory or the like, and a volatile portion, such as a random access memory (RAM) including a cache area for temporary storage of data. The DP 800 can be implemented on a single-chip, multiple chips or multiple electrical components. The data processing element 800 may be of any type appropriate to the local technical environment, and may include one or more of general purpose computers, special purpose computers (such as an application-specific integrated circuit (ASIC) or a field programmable gate array FPGA), digital signal processors (DSPs) and processors based on a multi-processor architecture, for instance.

The device may comprise at least one radio frequency transceiver 810 with a transmitter 814 and a receiver 812. However, it will be appreciated that in many cases a mobile communications device is a multimode device. By way of illustration, the electronic device may comprise radio units 810 to operate in accordance with any of a number of first, second, third and/or fourth-generation communication protocols or the like. For example, the device may operate in accordance with wireline protocols, such as Ethernet and digital subscriber line (DSL), with second-generation (2G) wireless communication protocols, such as GSM, with third-generation (3G) wireless communication protocols, such as 3G protocols by the 3GPP, CDMA2000, WCDMA and time division-synchronous CDMA (TD-SCDMA), with fourth-generation (4G) wireless communication protocols, such as 3GPP LTE, wireless local area networking protocols, such as 802.11, short-range wireless protocols, such as Bluetooth, and/or the like. In some cases the device 800 may be provided with software defined radio having only one transmitter and receiver and digital processing of different radio protocols. A single chip may be configured to provide two or more radio technologies.

The program 822 may comprise computer program instructions that, when executed by a data processor 800, enable the device to operate in accordance with at least some of embodiments of the present invention. The program may comprise computer program code configured to, with the at least one processor, cause the device to perform at least some of the features illustrated in connection with FIGS. 2 to 7.

The device may comprise a GPS or another positioning system receiver 830. The DP 800 may be arranged to receive input from and control user interface (UI) elements 840, such as a touch-screen display, keypad, etc. The device also typically comprises a battery 850, a microphone, a speaker, and audio circuitry 860 for generating audio processing.

It will be appreciated that the device may comprise chipsets to implement the high-level units illustrated in FIG. 8. For example, the device may comprise a power amplification chip for signal amplification, a baseband chip, and possibly further chips, which may be coupled to one or more (master) data processors (800).

It will be appreciated that the device typically comprises various further elements, such as further processor(s), further communication unit(s), user interface components, a media capturing element, sensors, such as an accelerometer, and a user identity module, not discussed in detail herein.

Embodiments of the present invention may thus be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with some examples of a computer being described and depicted in connection with FIGS. 2 and 8. A computer-readable medium may comprise a computer-readable storage medium that may be any media or means that can contain or store the instructions for use by or in connection with an instruction execution system, apparatus, or device, such as a computer.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method, comprising:
    determining, by a mobile terminal, a location of an access point connected to or connectable by the mobile terminal;
    determining an accuracy of the location of the access point;
    determining that the location of the access point is more accurate than an earlier stored location of the access point based on comparing the accuracy of the location of the access point to an accuracy of the earlier stored location of the access point; and
    in response to determining that the location of the access point is more accurate than the earlier stored location of the access point, updating a location database of the mobile terminal with the location of the access point.

2. The method of claim 1, further comprising:
    monitoring signal strength of the access point; and
    wherein updating the location database of the mobile terminal with the location of the access point is performed further responsive to the signal strength of the access point exceeding a threshold.

3. The method of claim 2, wherein the signal strength is compared to the threshold periodically.

4. The method of claim 1, wherein determining the accuracy of the location of the access point is conditioned upon a location inaccuracy estimate wherein the location inaccuracy estimate is based on signal strength of the access point.

5. The method of claim 1, further comprising:
    in response to not finding a previously stored location of the access point in the location database, adding a detected location of the access point to the location database of the mobile terminal.

6. The method of claim 1, further comprising:
    while having a cellular connection, attempting to establish a connection to the access point based at least partly on the earlier stored location of the access point and the location of the access point.

7. The method of claim 1, wherein determining the location of the access point is conditioned upon a current location of the mobile terminal, wherein the current location of the mobile terminal is based on information from an internal global positioning system receiver or a network server.

8. The method of claim 1, further comprising:
    storing the location of the access point to an access network discovery and selection function management object; and
    reporting the location of the access point to an access network discovery and selection function server.

9. The method of claim 1, further comprising:
    comparing an updated location of the access point to a previously stored location of the access point; and
    in response to determining a difference between the updated location of the access point and the previously stored location of the access point exceeds a dislocation threshold, replacing the previously stored location of the access point with the updated location of the access point without comparing to or regardless of location accuracies.

10. The method of claim 1, wherein determining the accuracy of the location of the access point comprises determining the accuracy of the location of the access point based on a signal strength of the access point.

11. The method of claim 1, wherein determining the accuracy of the location of the access point comprises determining the accuracy of the location of the access point based on a quality of a global positioning signal.

12. The method of claim 1, wherein determining the accuracy of the location of the access point comprises determining the accuracy of the location of the access point based on a direction of a global positioning signal.

13. An apparatus, comprising:
    at least one processor; and
    at least one memory storing computer program code that, with the at least one processor, cause a mobile terminal to at least:
        determine a location of an access point connected to or connectable by the mobile terminal;
        determine an accuracy of the location of the access point;
        determine that the location of the access point is more accurate than an earlier stored location of the access point based on comparing the accuracy of the location of the access point to an accuracy of the earlier stored location of the access point; and
        in response to determining that the location of the access point is more accurate than the earlier stored location of the access point, update a location database of the mobile terminal with the location of the access point.

14. The apparatus of claim 13, wherein the computer program code, with the at least one processor, cause the mobile terminal to:
  monitor signal strength of the access point; and
  wherein causing the mobile terminal to update the location database of the apparatus with the location of the access point is performed further responsive to the signal strength of the access point exceeding a threshold.

15. The apparatus of claim 14, wherein the computer program code, with the at least one processor, cause the mobile terminal to compare the signal strength to the threshold periodically.

16. The apparatus of claim 13, wherein causing the apparatus to determine the accuracy of the location of the access point is conditioned upon a location inaccuracy estimate, wherein the location inaccuracy estimate is based on signal strength of the access point.

17. The apparatus of claim 13, wherein the computer program code, with the at least one processor, cause the mobile terminal to add a detected location of the access point to the location database of the mobile terminal in response to not finding a previously stored location of the access point in the location database.

18. The apparatus of claim 13, wherein the computer program code, with the at least one processor, cause the mobile terminal to:
  while having a cellular connection, attempt to establish a connection to the access point based at least partly on the earlier stored location of the access point and the location of the access point.

19. The apparatus of claim 13, wherein causing the mobile terminal to determine the location of the access point is conditioned upon a current location of the mobile terminal, wherein the current location of the mobile terminal is based on information from an internal global positioning system receiver or a network server.

20. The apparatus of claim 13, wherein the computer program code, with the at least one processor, cause the mobile terminal to:
  store the location of the access point to an access network discovery and selection function management object; and
  report the location of the access point to an access network discovery and selection function server.

21. The apparatus of claim 13, wherein the computer program code, with the at least one processor, cause the mobile terminal to:
  compare an updated location of the access point to a previously stored location of the access point; and
  replace, in response to determining a difference between the updated location of the access point and the previously stored location of the access point exceeds a dislocation threshold, the previously stored location with the updated location without comparing to or regardless of location accuracies.

22. The apparatus of claim 13, wherein the apparatus is a chipset of the mobile terminal.

23. The apparatus of claim 13, wherein the apparatus is the mobile terminal, and wherein the mobile terminal comprises a transceiver for communicating within an IEEE 802.11 based network.

* * * * *

UNITED STATES PATENT AND TRADEMARK OFFICE
CERTIFICATE OF CORRECTION

PATENT NO. : 9,826,498 B2
APPLICATION NO. : 13/822674
DATED : November 21, 2017
INVENTOR(S) : Petri Tuominen et al.

Page 1 of 1

It is certified that error appears in the above-identified patent and that said Letters Patent is hereby corrected as shown below:

In the Claims

In Column 9, Claim 4, Line 65:
Please delete "estimate" and insert --estimate,--

Signed and Sealed this
Tenth Day of April, 2018

Andrei Iancu
*Director of the United States Patent and Trademark Office*